United States Patent
Byun et al.

(10) Patent No.: US 7,532,439 B2
(45) Date of Patent: May 12, 2009

(54) HARD DISK DRIVE ACTUATOR LATCH APPARATUS HAVING AN INCLINED SURFACE

(75) Inventors: Yong-kyu Byun, Yongin-si (KR);
Min-pyo Hong, Suwon-si (KR);
Jeong-il Chun, Seongnam-si (KR);
Heung-seong Jang, Suwon-si (KR);
Byoung-gyou Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 11/187,954

(22) Filed: Jul. 25, 2005

(65) Prior Publication Data

US 2006/0039086 A1   Feb. 23, 2006

(30) Foreign Application Priority Data

Aug. 17, 2004   (KR) .................. 10-2004-0064592

(51) Int. Cl.
*G11B 5/54* (2006.01)
(52) U.S. Cl. .................. 360/256.4; 360/256.2
(58) Field of Classification Search .............. 360/256.2, 360/256.4, 256.5
See application file for complete search history.

(56) References Cited

U.S. PATENT DOCUMENTS

| | | | | |
|---|---|---|---|---|
| 5,448,436 A * | 9/1995 | Albrecht | ............ | 360/256.4 |
| 6,529,349 B1 * | 3/2003 | Byun et al. | ............ | 360/256.4 |
| 6,535,357 B1 * | 3/2003 | Misso et al. | ............ | 360/256.2 |
| 6,535,359 B1 * | 3/2003 | Boutaghou | ............ | 360/256.4 |
| 6,624,980 B1 * | 9/2003 | Watson et al. | ............ | 360/256.4 |
| 6,710,980 B1 * | 3/2004 | Hauert et al. | ............ | 360/256.4 |
| 7,242,555 B2 * | 7/2007 | Kanada et al. | ............ | 360/256 |
| 7,248,440 B2 * | 7/2007 | Kim et al. | ............ | 360/256.2 |
| 7,286,327 B2 * | 10/2007 | Jeong | ............ | 360/256.2 |
| 2002/0141116 A1 * | 10/2002 | Hong et al. | ............ | 360/256.4 |
| 2003/0035246 A1 * | 2/2003 | Byun et al. | ............ | 360/256.4 |
| 2004/0145831 A1 * | 7/2004 | Kanada et al. | ............ | 360/256.4 |
| 2004/0179305 A1 * | 9/2004 | Miyamoto et al. | ............ | 360/256.4 |
| 2005/0174697 A1 * | 8/2005 | Kim et al. | ............ | 360/256.2 |
| 2005/0180055 A1 * | 8/2005 | Kim et al. | ............ | 360/256.4 |
| 2007/0121252 A1 * | 5/2007 | Hong et al. | ............ | 360/254 |
| 2008/0055783 A1 * | 3/2008 | HEO et al. | ............ | 360/256 |
| 2008/0192386 A1 * | 8/2008 | Hwang et al. | ............ | 360/256.2 |

FOREIGN PATENT DOCUMENTS

KR   2003-0037568 A   5/2003

* cited by examiner

*Primary Examiner*—Jefferson Evans
(74) *Attorney, Agent, or Firm*—Sughrue Mion, PLLC

(57) ABSTRACT

An actuator latch apparatus for a hard disk drive (HDD). The actuator latch apparatus includes a first latch formed on one end portion of a swing arm, a notch formed on the one end portion of the swing arm and spaced a predetermined interval from the first latch in a pivoting direction of the swing arm, and a latch lever pivotably installed on a base member. The latch lever includes a second latch contacting the first latch when the swing arm pivots in a first direction, and a hook engaging with the notch when the swing arm pivots in a second direction opposite to the first direction. Facing surfaces of the first latch and the second latch are inclined such that the first latch and the second latch slide into contact with each other when the swing arm pivots in the first direction.

14 Claims, 7 Drawing Sheets

HARD DISK DRIVE ACTUATOR LATCH APPARATUS HAVING AN INCLINED SURFACE

This application claims priority from Korean Patent Application No. 10-2004-0064592, filed on Aug. 17, 2004, in the Korean Intellectual Property Office, the disclosure of which is incorporated herein in its entirety by reference.

BACKGROUND OF THE INVENTION

1. Field of the Invention

The present invention relates to a hard disk drive (HDD) and, more particularly, to an actuator latch apparatus for a HDD, which prevents an actuator from arbitrarily rotating due to an external shock by locking the actuator at a predetermined position when a disk stops rotating.

2. Description of the Related Art

Hard disk drives (HDDs), which store information in computers, reproduce or record data on a disk using a read/write head. In such a HDD, the read/write head functions by being moved to a desired position by an actuator while being lifted above a recording surface of a rotating disk.

In the meantime, if the HDD does not operate, that is, the disk stops rotating, the read/write head is parked off the recording surface of the disk to prevent a collision with the recording surface of the disk. Such head parking systems can be classified into a contact start stop (CSS) system and a ramp loading system. In the CSS system, a parking zone where data is not recorded is formed on an inner circumferential side of the disk and the head is parked in contact with the parking zone. In the ramp loading system, the head is parked on a ramp that is installed outside the disk.

When the head is parked on the parking zone or the ramp, the actuator may arbitrarily rotate due to an external shock or vibration applied to the HDD such that the head is forced out of the parking zone or the ramp and on the recording surface of the disk. In this case, the head comes into contact with the recording surface of the disk, such that the head and the recording surface of the disk may be damaged. Therefore, when the head is parked on the parking zone or the ramp, the actuator must be locked to a predetermined position so that it cannot rotate accidentally. For this purpose, various kinds of actuator latch apparatuses are provided in the HDD.

FIGS. 1A, 1B, and 1C illustrate a conventional inertial latch apparatus in a HDD.

Referring to FIG. 1A, a HDD includes an actuator 10 that moves a read/write head for data reproduction and recording to a desired position on a disk. The actuator 10 includes a swing arm 12, which is pivotably coupled to an actuator pivot 11, a suspension 13, which is installed on a front end portion of the swing arm 12 and elastically biases a slider 14 with the read/write head thereon toward a surface of the disk, and a voice coil motor (VCM), which rotates the swing arm 12. The VCM includes a VCM coil 16, which is coupled to a rear end portion of the swing arm 12, and a magnet 17, which faces the VCM coil 16.

The HDD further includes an inertial latch apparatus 20 that locks the actuator 10 when the read/write head is parked on a ramp 19. The inertial latch apparatus 20 includes a latch lever 21, which pivots around a latch pivot 22 due to inertia, and a notch 26, which is provided on the rear end portion of the swing arm 12 of the actuator 10. A hook 23 is provided on a front end portion of the latch lever 21 and engages with the notch 26. An iron core 24 is installed on a rear end portion of the latch lever 21 such that a magnetic force acts between the iron core 24 and the magnet 17. The latch lever 21 rotates clockwise due to the magnetic force between the iron core 24 and the magnet 17.

The operation of the conventional inertial latch apparatus 20 will now be explained. First, referring to FIG. 1A, if the head mounted on the slider 14 is parked on the ramp 19, the swing arm 12 pivots clockwise around the actuator pivot 11 due to the VCM. Accordingly, the rear end portion of the swing arm 12 contacts the rear end portion of the latch lever 21, such that the latch lever 21 pivots counterclockwise. Subsequently, if the swing arm 12 continuously pivots clockwise, as shown in FIG. 1B, the notch 26 of the swing arm 12 contacts the front end portion of the latch lever 21 that pivots counterclockwise. Accordingly, the swing arm 12 stops pivoting, thereby completely parking the head mounted on the slider 14.

When the head is parked, if a clockwise rotational shock is applied to the HDD, the swing arm 12 and the latch lever 21 pivot counterclockwise due to inertia. Accordingly, the notch 26 of the swing arm 12 is caught by the hook 23 of the latch lever 21, such that the swing arm 12 cannot rotate further. In contrast, if a counterclockwise rotational shock is applied to the HDD, the swing arm 12 and the latch lever 21 rotate clockwise due to inertia, such that the rear end portion of the swing arm 12 collides with the rear end portion of the latch lever 21 due to their clockwise rotation. The swing arm 12 and the latch lever 21 rebound due to the collision, and pivot counterclockwise, respectively. Accordingly, as described above, the notch 26 of the swing arm 12 is caught by the hook 23 of the latch lever 21, such that the swing arm 12 cannot rotate further.

Next, referring to FIG. 1C, to operate the HDD, the head must be moved from the ramp 19 to a recording surface of the disk. To this end, the swing arm 12 pivots counterclockwise due to the VCM. At the same time, the latch lever 21 pivots clockwise due to the magnetic force acting between the magnet 17 and the iron core 24. Accordingly, since the notch 26 of the swing arm 12 is not interfered with by the hook 23 of the latch lever 21, the swing arm 12 pivots counterclockwise without interference by the latch lever 21.

However, in the conventional inertial latch apparatus 20, while the swing arm 12 rotates clockwise to park the head, which is mounted on the slider 14, on the ramp 19, the swing arm 12 contacts the latch lever 21 twice as described above. During the contacts, a considerable shock is applied to the latch lever 21, and a considerable noise is caused due to the shock.

To reduce such a noise, the conventional latch apparatus 20 adopts shock-absorbing pads 28 and 29 installed on contact portions between the latch lever 21 and the swing arm 12. The softer shock-absorbing pads 28 and 29 result in the higher shock-absorbing effect but the less precise operation of the actuator 10. Accordingly, to ensure a precise operation of the actuator 10, relatively hard pads 28 and 29 need to be used. As a result, the conventional latch apparatus 20 has a limitation in reducing a noise using the pads 28 and 29.

SUMMARY OF THE INVENTION

The present invention provides an actuator latch apparatus for a hard disk drive, which can reduce a noise and ensure a precise operation of an actuator by permitting a swing arm and a latch lever to slide into contact with each other.

According to an aspect of the present invention, there is provided an actuator latch apparatus for a hard disk drive, which locks an actuator to a head parking position when the hard disk drive stops operating. The actuator includes a swing arm pivotably installed on a base member, a voice coil motor coil coupled to one end portion of the swing arm, and a magnet facing the voice coil motor coil. The actuator latch apparatus comprises a first latch formed on the one end portion of the swing arm; a notch formed on the one end portion of the swing arm and spaced a predetermined interval from the first latch in a pivoting direction of the swing arm; and a latch lever pivotably installed on the base member and including a second latch, which contacts the first latch when the swing arm pivots in a first direction, and a hook, which engages with the notch when the swing arm pivots in a second direction opposite to the first direction. Facing surfaces of the first latch and the second latch are inclined so that the first latch and the second latch can slide into contact with each other when the swing arm pivots in the first direction.

When the swing arm pivots in the first direction, an edge part of the second latch may contact the inclined surface of the first latch such that the edge part of the second latch slides along the inclined surface of the first latch.

When the swing arm pivots in the first direction, an edge part of the first latch may contact the inclined surface of the second latch such that the edge part of the first latch slides along the inclined surface of the second latch.

An angle between either of the inclined surfaces and a direction of a rotational force of the swing arm applied to a contact point between the first latch and the second latch may be less than 60°. The angle may range from 30 to 50°.

The swing arm may have a protrusion protruding from the one end portion thereof, and the first latch and the notch may be formed on both sides of the protrusion.

The hook may be formed on a front end portion of the latch lever, and the second latch may be formed near to a pivot axis of the latch lever.

The actuator latch apparatus may further include a first latch pin provided on the one end portion of the swing arm such that a first direction torque is applied to the swing arm due to a magnetic force of the magnet; and a second latch pin provided on a rear end portion of the latch lever such that a first direction torque is applied to the latch lever due to the magnetic force of the magnet.

The first latch pin and the second latch pin may be magnetic bodies. The swing arm may have a protrusion protruding from the one end portion thereof, and the first latch pin may be installed on the protrusion. The first direction torque applied to the swing arm may be greater than the first direction torque applied to the latch lever.

The first direction pivoting of the latch lever may be limited by a side wall of the base member.

The first direction may be toward the head parking position.

Since the swing arm slides into contact with the latch lever when the head is parked, a noise caused by contact between the swing arm and the latch lever can be effectively reduced. Further, since pads are not used, a precise operation of the actuator can be ensured.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
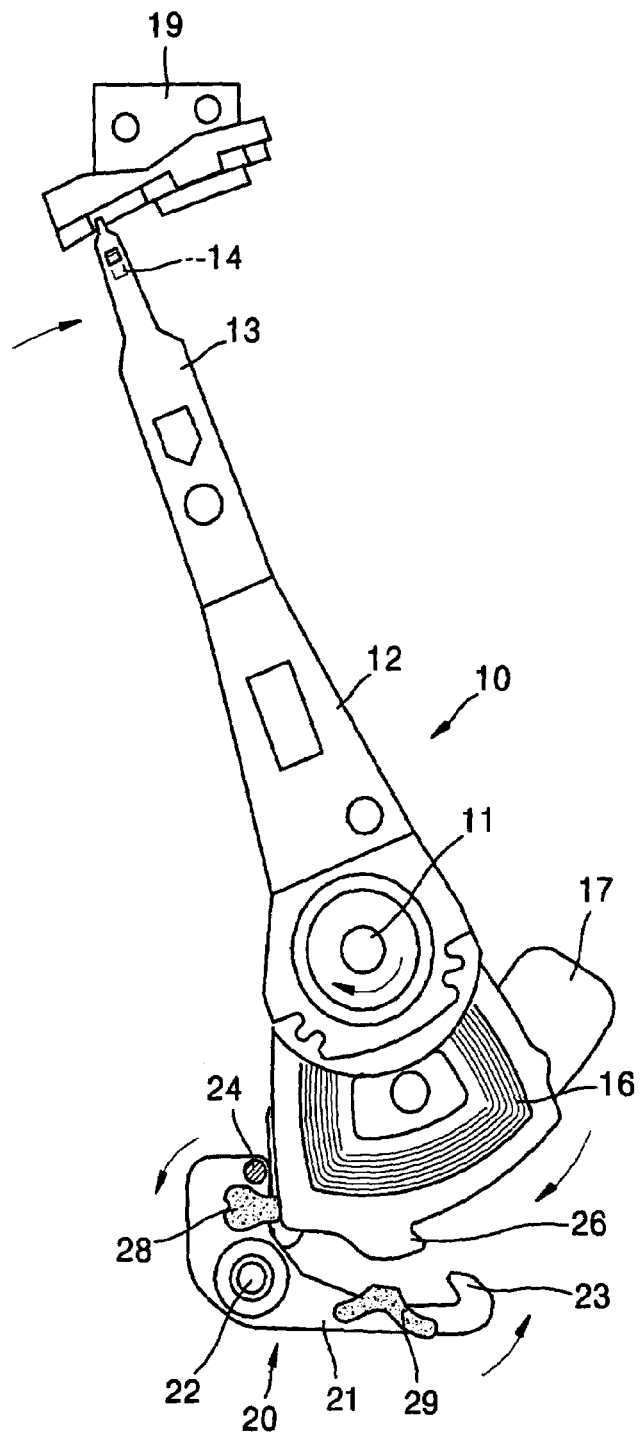
FIGS. 1A through 1C are plan views of a conventional inertial latch apparatus for a hard disk drive (HDD)
Figure 1B:
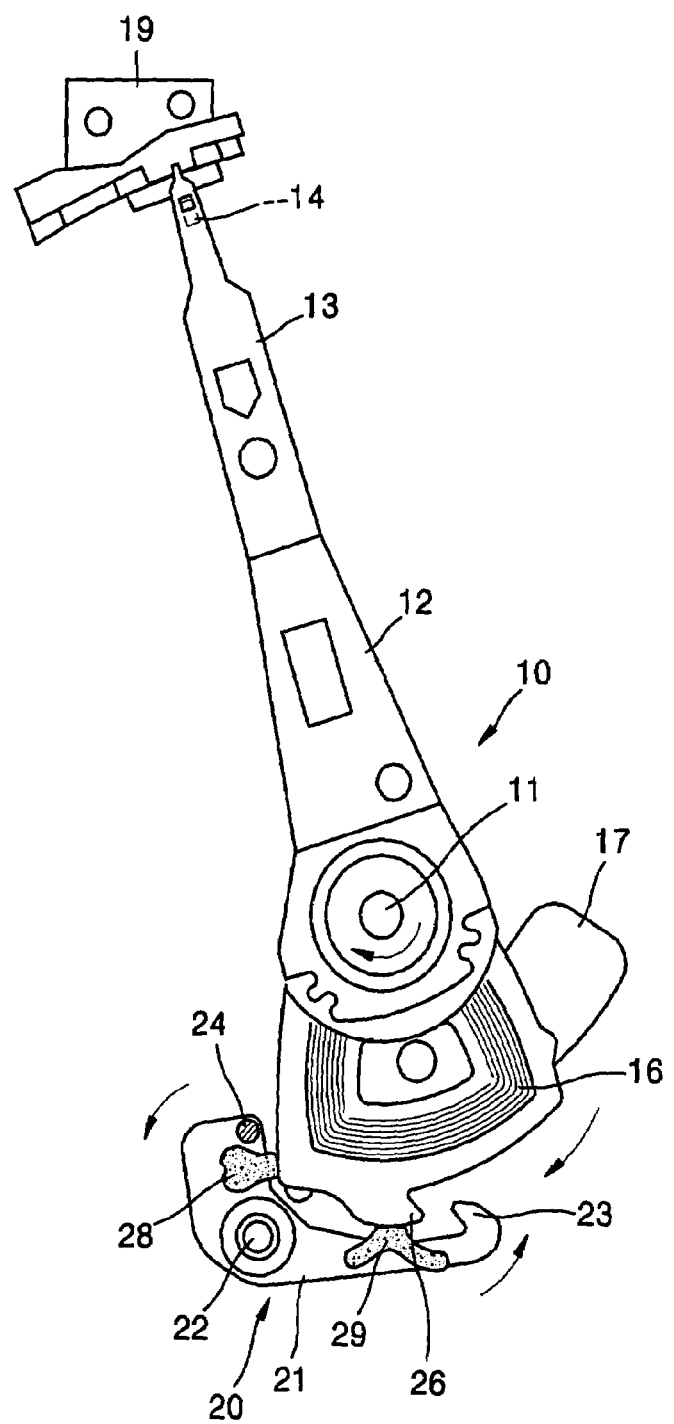
Figure 1C:
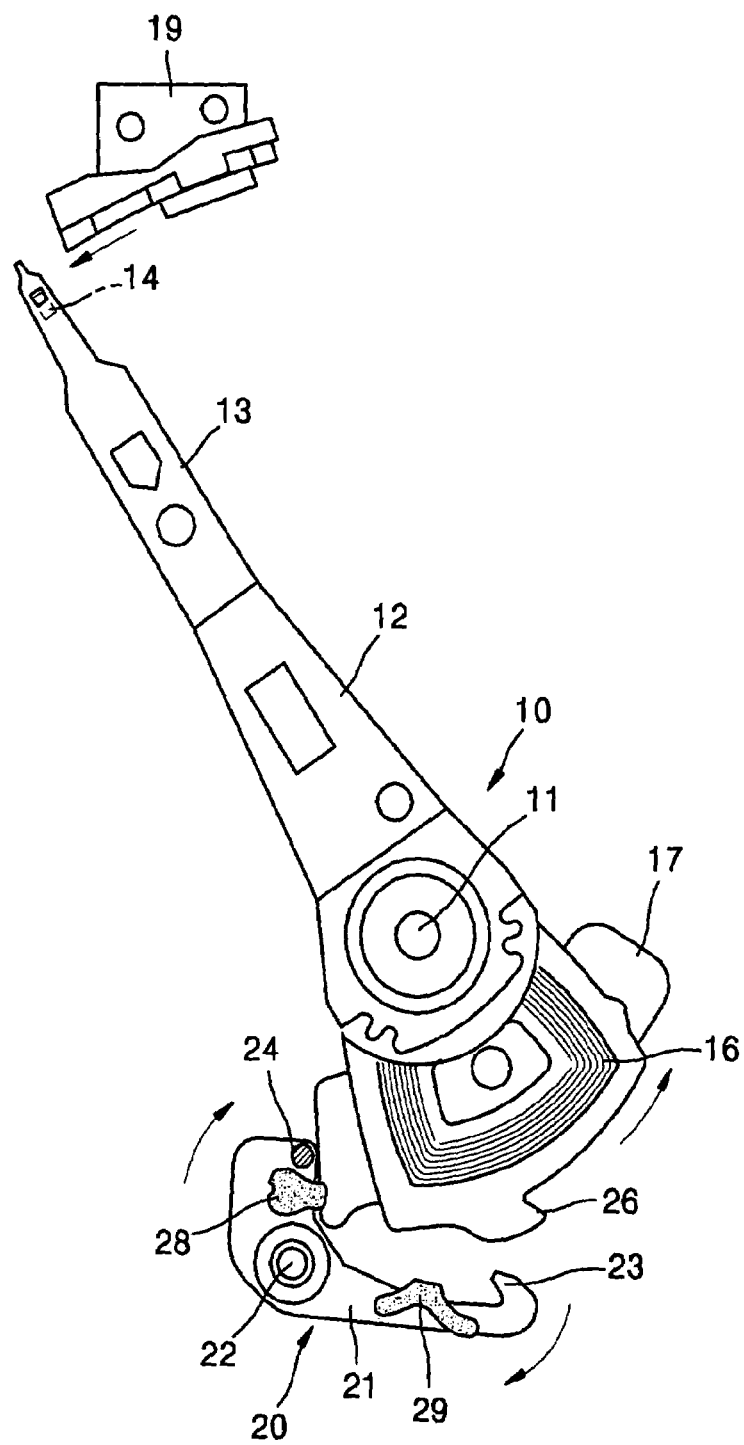

Exemplary embodiments of the present invention will now be described more fully with reference to the accompanying drawings, in which the same elements are given the same reference numerals throughout. The described exemplary embodiments are intended to assist the understanding of the invention, and are not intended to limit the scope of the invention in any way.

Figure 2:
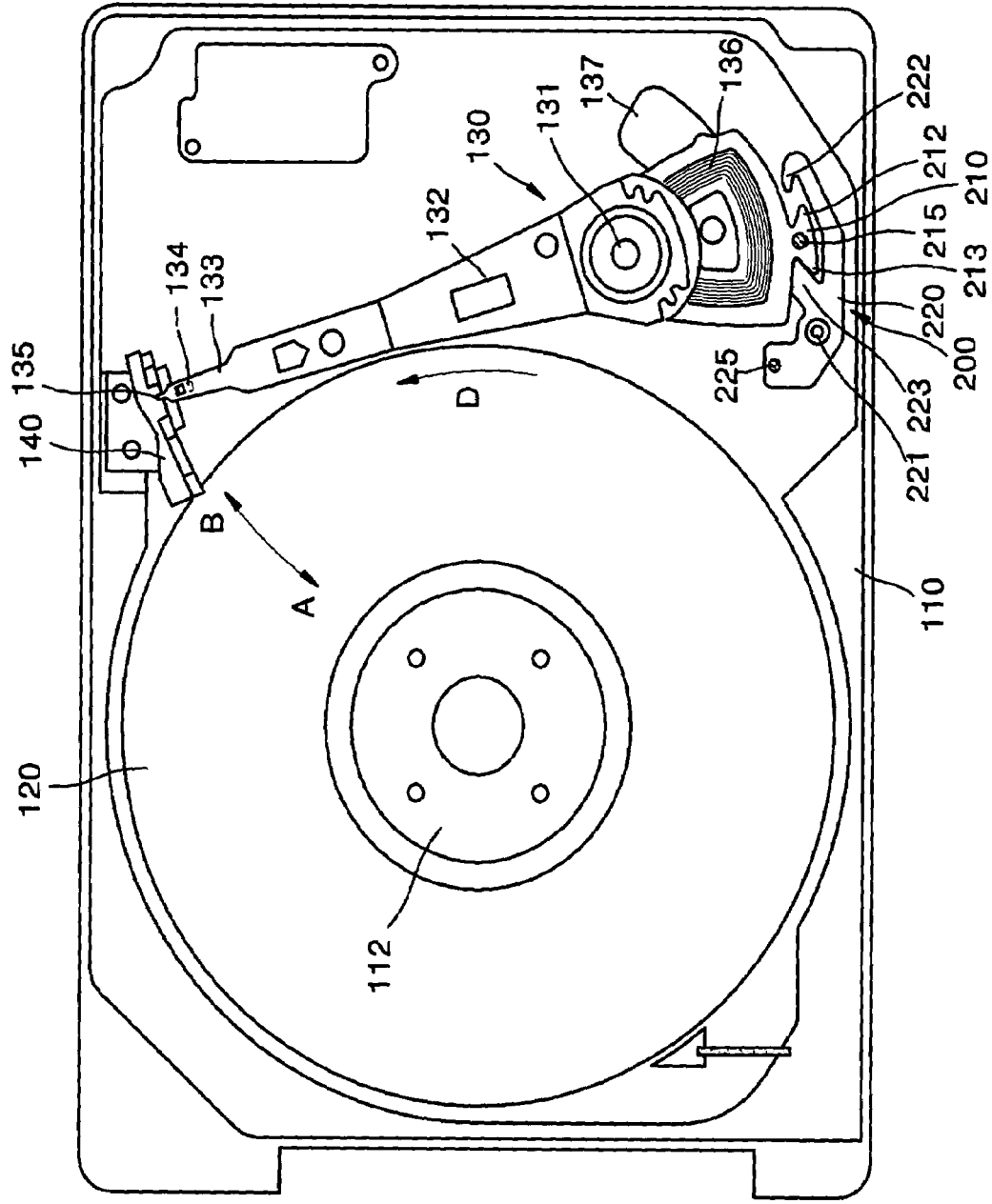
FIG. 2 is a plan view of a HDD provided with an actuator latch apparatus according to an exemplary embodiment of the present invention.
Figure 3:
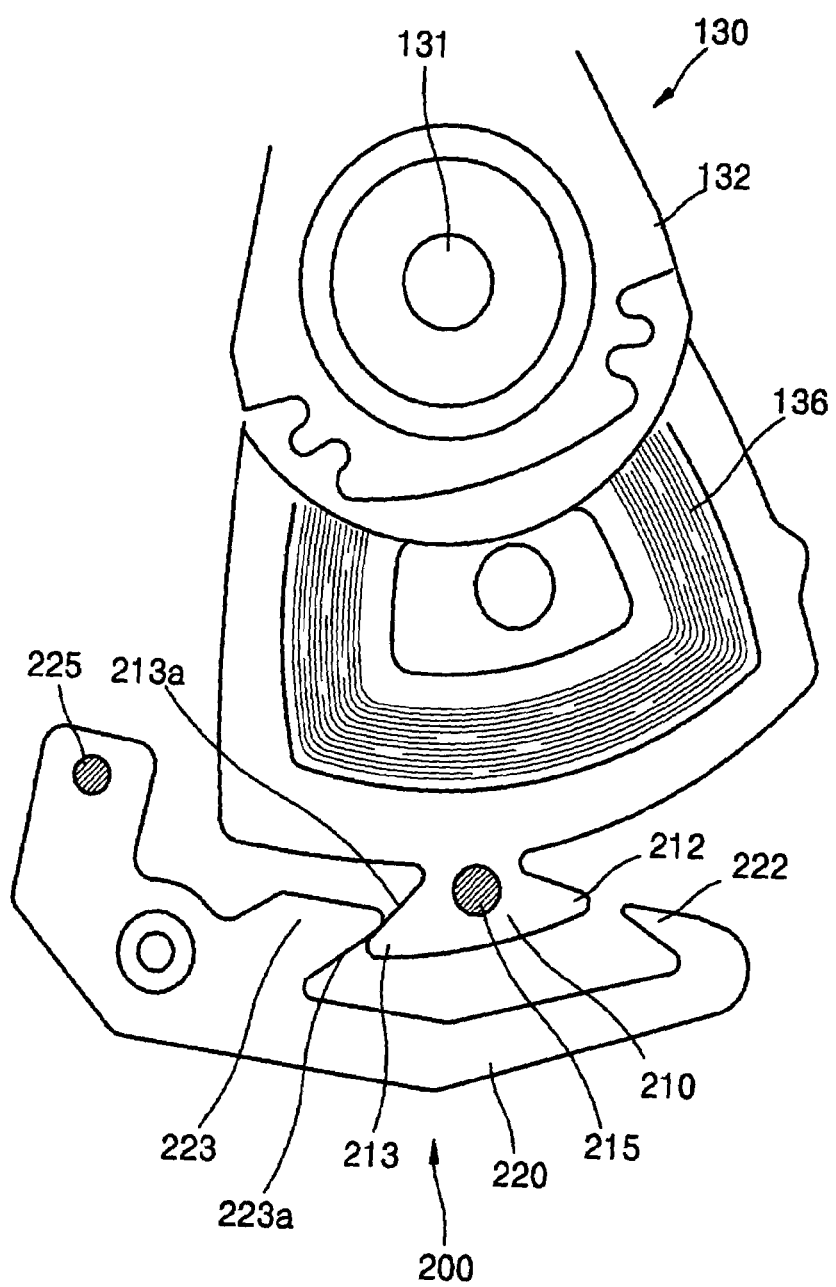
FIG. 3 is an enlarged plan view of the actuator latch apparatus of FIG. 2 for explaining the operation of the actuator latch apparatus when an actuator rotates to park a head.

FIG. 2 is a plan view of a hard disk drive (HDD) provided with an actuator latch apparatus according to an exemplary embodiment of the present invention. FIG. 3 is an enlarged plan view of the actuator latch apparatus of FIG. 2 for explaining the operation of the actuator latch apparatus when an actuator rotates to park a head.

Referring to FIGS. 2 and 3, a HDD includes a disk 120 mounted on a spindle motor 112, and an actuator 130 adapted to move a read/write head for data recording and reproduction to a predetermined position on the disk 120. The actuator 130 includes a swing arm 132 pivotably coupled to an actuator pivot 131 that is installed on a base member 110 of the HDD, a suspension 133 installed on a front end portion of the swing arm 132 and elastically biasing a slider 134 with the read/write head thereon toward a surface of the disk 120, and a voice coil motor (VCM) rotating the swing arm 132.

The VCM includes a VCM coil 136 coupled to a rear end portion of the swing arm 132, and a magnet 137 facing the VCM coil 136. The VCM is controlled by a servo control system, and rotates the swing arm 132 in a direction according to Fleming's Left Hand Rule due to an interaction between current input to the VCM coil 136 and a magnetic field formed by the magnet 137.

For example, if the HDD using a ramp-loading type head parking system is turned on and the disk 120 begins to rotate, the VCM rotates the swing arm 132 counterclockwise indicated by arrow A to move the read/write head from a ramp 140 installed outside the disk 120 to a position above a recording surface of the disk 120. In contrast, if the HDD is turned off and the disk 120 stops rotating, the VCM rotates the swing arm 132 clockwise indicated by arrow B to remove the read/write head from the disk 120.

At this time, the head removed from the recording surface of the disk 120 is parked on the ramp 140 installed outside the disk 120. Specifically, if the disk 120 stops rotating, the swing arm 132 rotates in the direction indicated by arrow B due to the VCM, and accordingly, an end-tap 135 formed on an end portion of the suspension 133 is parked on the ramp 140.

On the other side, if the HDD using a contact start stop (CSS) type head parking system is turned on and the disk 120 begins to rotate, the VCM rotates the swing arm 132 clockwise to move the read/write head from a parking zone formed on an inner circumferential side of the disk 120 to a data zone formed on an outer circumferential side of the disk 120. In contrast, of the HDD is turned off and the disk 120 stops rotating, the VCM rotates the swing arm 132 counterclockwise to move the read/write head from the data zone to the parking zone.

The HDD having the actuator 130 is provided with an actuator latch apparatus 200 according to an exemplary embodiment of the present invention. The actuator latch apparatus 200 locks the actuator 130 when the HDD stops operating so that the read/write head mounted on the actuator 130 can be kept parked on a parking region, for example, on the ramp 140. That is, when the disk 120 stops rotating, the actuator latch apparatus 200 prevents the actuator 130 from unnecessarily pivoting due to an external shock or vibration such that the read/write head cannot be forced out of the ramp 140 and on the recording surface of the disk 120.

The actuator latch apparatus 200 includes a first latch 213 and a notch 212, which are formed on the rear end portion of the swing arm 132, and a latch lever 220, which is pivotably installed on the base member 110 and includes a second latch 223 and a hook 222 respectively corresponding to the first latch 213 and the notch 212.

The first latch and the notch 212 are formed on the rear end portion of the swing arm 132 and spaced apart from each other in a pivoting direction of the swing arm 132. The VCM coil 136 is coupled to the rear end portion of the swing arm 132 as described previously. To this end, the rear end portion of the swing arm 132 is typically made of plastic material. The first latch 213 and the notch 212 formed on the rear end portion of the swing arm 132 project horizontally from the rear end portion of the swing arm 132 through plastic injection molding. Here, although the first latch 213 and the notch 212 may be separately formed, it is preferable that a protrusion protrudes from the rear end portion of the swing arm 132 and the first latch 213 and the notch 212 be formed on both sides of the protrusion 210.

The latch lever 220 is pivotably coupled to a latch pivot 221 that is installed on the base member 110. The latch lever 220 pivots in a first direction, for example, clockwise, or in a second direction, for example, counterclockwise, due to inertia when an external shock is applied thereto.

The hook 222 is formed on a front end portion of the latch lever 220. The hook 222 interferes with the notch 212 of the swing arm 132 when the read/write head is parked on the ramp 140 to prevent the swing arm 132 from arbitrarily pivoting. The operation of the hook 222 will be explained later.

The second latch 223 is disposed at a substantially middle portion of the latch lever 20, that is, near to the latch pivot 221. When the swing arm 132 pivots clockwise to park the read/write head, the second latch 223 contacts the first latch 213 of the swing arm 132 to limit the clockwise pivoting of the swing arm 132. Accordingly, the swing arm 132 can be placed on an exact head parking position.

A surface 213a of the first latch 213 and a surface 223a of the second latch 223, which face each other, are inclined so that the first latch 213 and the second latch 223 can slide into contact with each other when the swing arm 132 pivots clockwise.

Figure 4A:
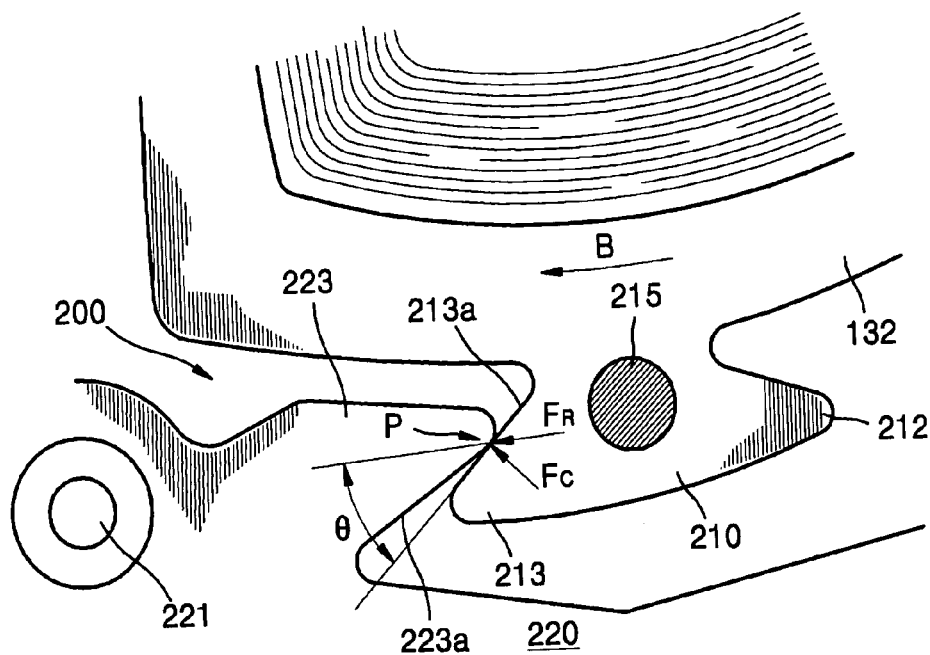
FIGS. 4A and 4B are plan views illustrating two cases where a first latch and a second latch in the actuator latch apparatus of FIG. 3 contact each other.
Figure 4B:
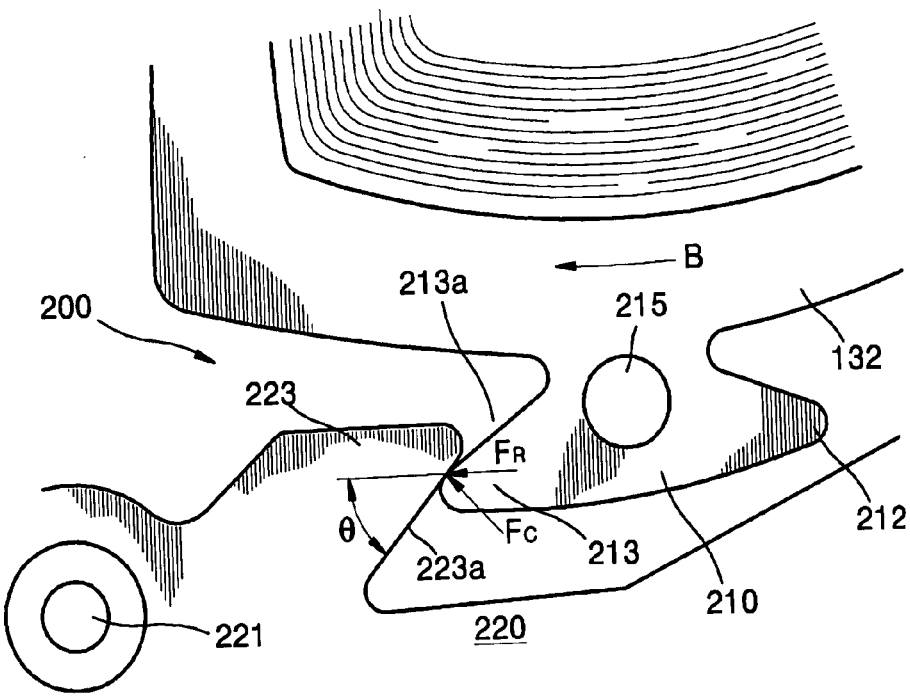

This will be explained in detail with reference to FIGS. 4A and 4B. FIGS. 4A and 4B are plan views illustrating two cases where the first latch and the second latch shown in FIG. 3 contact each other.

First, referring to FIG. 4A, the actuator system 200 may be structured such that when the swing arm 132 pivots clockwise as indicated by arrow B, an edge part of the second latch 223 contacts the inclined surface 213a of the first latch 213 and the edge part of the second latch 223 slides along the inclined surface 213a.

At this time, a rotational force $F_R$ of the swing arm 132 is applied to a contact point P between the first latch 213 and the second latch 223. A direction of the rotational force $F_R$ is parallel to a pivoting direction of the swing arm 132. A noise generated by contact between the first latch 213 and the second latch 223 is proportional to a contact force $F_C$ vertically applied to the inclined surface 213a of the first latch 213. A relationship between the rotational force $F_R$ and the contact force $F_C$ can be expressed by the following Equation 1.

$$F_C = F_R \cos(90\text{-}\theta) \qquad \text{Equation 1}$$

where $\theta$ denotes a contact angle between the direction of the rotational force $F_R$ of the swing arm 132 applied to the contact point P and the inclined surface 213a of the first latch 213.

Referring to Equation 1, as the contact angle $\theta$ decreases, the contact force $F_C$ decreases. Accordingly, a noise caused by contact between the first latch 213 and the second latch 223 can be more effectively reduced.

The contact angle $\theta$ may be determined to be less than 60° in order to sufficiently reduce a noise. In particular, it may be preferable that the contact angle $\theta$ range from 30 to 50°. If the contact angle $\theta$ is less than 30°, the first latch 213 and the second latch 223 are so sharp that they are weak and it is hard to manufacture them.

Next, referring to FIG. 4B, the actuator latch apparatus 200 may be structured such that when the swing arm 132 pivots clockwise indicated by arrow B, an edge part of the first latch 213 contacts the inclined surface 223a of the second latch 223 and the edge part of the first latch 213 slides along the inclined surface 223a.

At this time, the relationship between the rotational force $F_R$ of the swing arm applied to the contact point P between the first latch 213 and the second latch 223 and the contact force $F_C$ vertically applied to the inclined surface 223a of the second latch 223 is the same as that described previously. Accordingly, as the contact angle $\theta$ between the direction of the rotational force $F_R$ of the swing arm 132 applied to the contact point P and the inclined surface 223a of the second latch 223 decreases, the contact force $F_C$ decreases. Consequently, a noise caused by contact between the first latch 213 and the second latch 223 is more effectively reduced. As aforementioned, the contact angle $\theta$ is determined to be less than 60°, and preferably, range from 30 to 50°.

Since the actuator latch apparatus 200 allows the first latch 213 disposed on the swing arm 132 and the second latch 223 disposed on the latch lever 220 to slide into contact with each other when the head is parked, a noise caused by contact between the swing arm 132 and the latch lever 220 can be effectively reduced. Since the actuator latch apparatus 200 does not use shock-absorbing pads to reduce a noise, a precise operation of the actuator 130 can be ensured.

As described above, while the first latch 213 and the second latch 223 slide into contact with each other, the swing arm 132 continuously pivots clockwise, and the latch lever 220 pivots counterclockwise due to the swing arm 132. As shown in FIG. 2, if the second latch 223 of the latch lever 220 contacts an outer surface of the rear end portion of the swing arm 132, the clockwise pivoting of the swing arm 132 stops, thereby completely parking the head on that position.

In such a way, when the HDD stops operating and the read/write head is parked on the ramp 140, if the swing arm 132 of the actuator 130 pivots counterclockwise, that is, in the second direction due to an external shock, the latch lever 220 also pivots counterclockwise due to inertia. Accordingly, the notch 212 formed on the rear end portion of the swing arm 132 engages with the hook 222 of the latch lever 220, thereby preventing the swing arm 132 from arbitrarily rotating.

The actuator latch apparatus 200 may further include a first latch pin 215 provided on the rear end portion of the swing arm 132, and a second latch pin 225 provided on a rear end portion of the latch lever 220.

The first latch pin 215 may be disposed on the protrusion 210 of the swing arm 132. The first latch pin 215 may be a magnetic body, and preferably, but not necessarily, made of ferromagnetic steel, so that a magnetic force of the magnet 137 can act on the first latch pin 215. The first latch pin 215 applies a clockwise torque to the swing arm 132. In detail, since the magnetic force of the magnet 137 acts on the first latch pin 215, a clockwise torque is always applied to the swing arm 132 due to the magnetic force. The clockwise torque applied to the swing arm 132 prevents the swing arm 132 from pivoting counterclockwise due to a relatively small shock and vibration, such that the swing arm 132 can be kept on the head parking position.

The second latch pin 225 is disposed on the rear end portion of the latch lever 220. The second latch pin 225 may be a magnetic body, and preferably, but not necessarily, made of ferromagnetic steel so that the magnetic force of the magnet 137 can act on the second latch pin 225. The second latch pin 225 applies a clockwise torque to the latch lever 220. In detail, since the magnetic force of the magnet 137 acts on the second latch pin 225, a clockwise torque is always is applied to the latch lever 220 due to the magnetic force.

It may be preferable that the clockwise torque applied to the swing arm 132 be greater than the clockwise torque applied to the latch lever 220. This is because when the swing arm 132 is placed on the parking position, the swing arm 132 is prevented from pivoting counterclockwise due to the torque applied to the latch lever 220.

Figure 5:
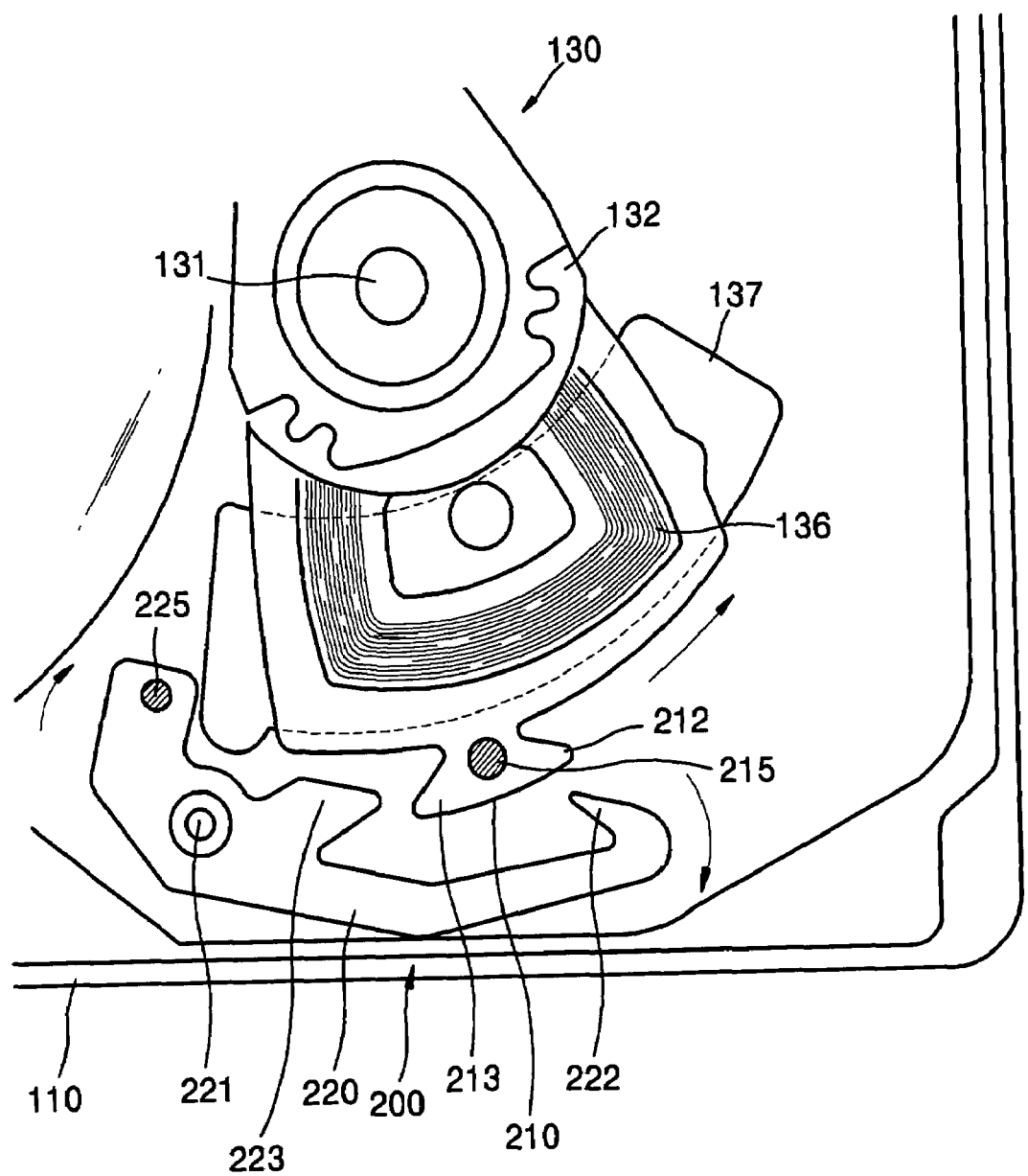
FIG. 5 is a plan view for explaining a release of the locked actuator latch apparatus of FIG. 3.

FIG. 5 is a plan view for explaining a release of the locked actuator latch apparatus of FIG. 3.

Referring to FIG. 5, if the HDD is turned on, a counterclockwise rotational force is applied to the swing arm 132 due to the VCM coil 136 and the magnet 137 disposed on the rear end portion of the swing arm 132, as mentioned above. The swing arm 132 pivots counterclockwise while overcoming the clockwise torque applied from the magnet 137 and the first latch pin 215. At the same time, the latch lever 220 pivots clockwise due to the clockwise torque applied from the second latch pin 225 and the magnet 137. Accordingly, the notch 212 of the swing arm 132 that rotates counterclockwise is not interfered with by the hook 222 of the latch lever 220. At this time, the clockwise pivoting of the latch lever 220 is limited by a side wall of the base member 110. That is, the side wall of the base member 110 acts as a latch stop limiting the clockwise pivoting of the latch lever 220.

As described above, the actuator latch apparatus for the HDD is constructed such that the swing arm and the latch lever slide into contact with each other when the head is parked, thereby effectively reducing a noise caused by contact between the swing arm and the latch lever.

The actuator latch apparatus does not employ conventional pads, thereby ensuring a precise operation of the actuator.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, although the actuator latch apparatus in the exemplary embodiments is applied to the HDD using the ramp loading type head parking system, the actuator latch apparatus can be applied to the HDD using the CSS type head parking system. Accordingly, the spirit and scope of the present invention should be defined by the following claims.

What is claimed is:

1. An actuator latch apparatus for a hard disk drive, which locks an actuator to a head parking position when the hard disk drive stops operating, the actuator including a swing arm pivotably installed on a base member, a voice coil motor coil coupled to one end portion of the swing arm, and a magnet facing the voice coil motor coil, the actuator latch apparatus comprising:
a first latch formed on the one end portion of the swing arm;
a notch formed on the one end portion of the swing arm and spaced a predetermined interval from the first latch in a pivoting direction of the swing arm; and
a latch lever pivotably installed on the base member and including a second latch, which contacts the first latch when the swing arm pivots in a first direction, and a hook, which engages with the notch when the swing arm pivots in a second direction opposite to the first direction;
wherein facing surfaces of the first latch and the second latch are inclined so that the facing surface of either the first or second latch slides along the facing surface of the other latch as the first latch comes into contact with the second latch when the swing arm pivots in the first direction, and
wherein an angle between either of the inclined surfaces and a direction of a rotational force of the swing arm applied to a contact point between the first latch and the second latch is less than 60°.

2. The actuator latch apparatus of claim 1, wherein when the swing arm pivots in the first direction, an edge part of the second latch contacts the inclined surface of the first latch such that the edge part of the second latch slides along the inclined surface of the first latch.

3. The actuator latch apparatus of claim 1, wherein when the swing arm pivots in the first direction, an edge part of the first latch contacts the inclined surface of the second latch such that the edge part of the first latch slides along the inclined surface of the second latch.

4. The actuator latch apparatus of claim 1, wherein the angle ranges from 30 to 50.

5. The actuator latch apparatus of claim 1, wherein the swing arm has a protrusion protruding from the one end portion thereof, and the first latch and the notch are formed on opposite sides of the protrusion.

6. The actuator latch apparatus of claim 1, wherein the hook is formed on a front end portion of the latch lever, and the second latch is formed near to a pivot axis of the latch lever.

7. The actuator latch apparatus of claim 1, wherein the first direction pivoting of the latch lever is limited by a side wall of the base member.

8. The actuator latch apparatus of claim 1, wherein the first direction is toward the head parking position.

9. The actuator latch apparatus of claim 1, wherein the facing surface of the first latch is inclined with respect to the facing surface of the second latch and is configured to slide along the facing surface of the second latch.

10. The actuator latch apparatus of claim 1, wherein the facing surface of the second latch is inclined with respect to the facing surface of the first latch and is configured to slide along the facing surface of the first latch.

11. An actuator latch apparatus for a hard disk drive, which locks an actuator to a head parking position when the hard disk drive stops operating the actuator including a swing arm pivotably installed on a base member, a voice coil motor coil coupled to one end portion of the swing arm, and a magnet facing the voice coil motor coil, the actuator latch apparatus comprising:

a first latch formed on the one end portion of the swing arm;

a notch formed on the one end portion of the swing arm and spaced a predetermined interval from the first latch in a pivoting direction of the swing arm;

a latch lever pivotably installed on the base member and including a second latch which contacts the first latch when the swing arm pivots in a first direction, and a hook which engages with the notch when the sing arm pivots in a second direction opposite to the first direction;

a first latch pin provided on the one end portion of the swing arm such that a first direction torque is applied to the swing arm due to a magnetic force of the magnet; and a second latch pin provided on a rear end portion of the latch lever such that a first direction torque is applied to the latch lever due to the magnetic force of the magnet;

wherein facing surfaces of the first latch and the second latch are inclined so that the facing surface of either the first or second latch slides along the facing surface of the other latch as the first latch comes into contact with the second latch when the swing arm pivots in the first direction.

12. The actuator latch apparatus of claim 11, wherein the first latch pin and the second latch pin are magnetic bodies.

13. The actuator latch apparatus of claim 11, wherein the swing arm has a protrusion protruding from the one end portion thereof, and the first latch pin is installed on the protrusion.

14. The actuator latch apparatus of claim 11, wherein the first direction torque applied to the swing arm is greater than the first direction torque applied to the latch lever.

* * * * *